Figure 1:
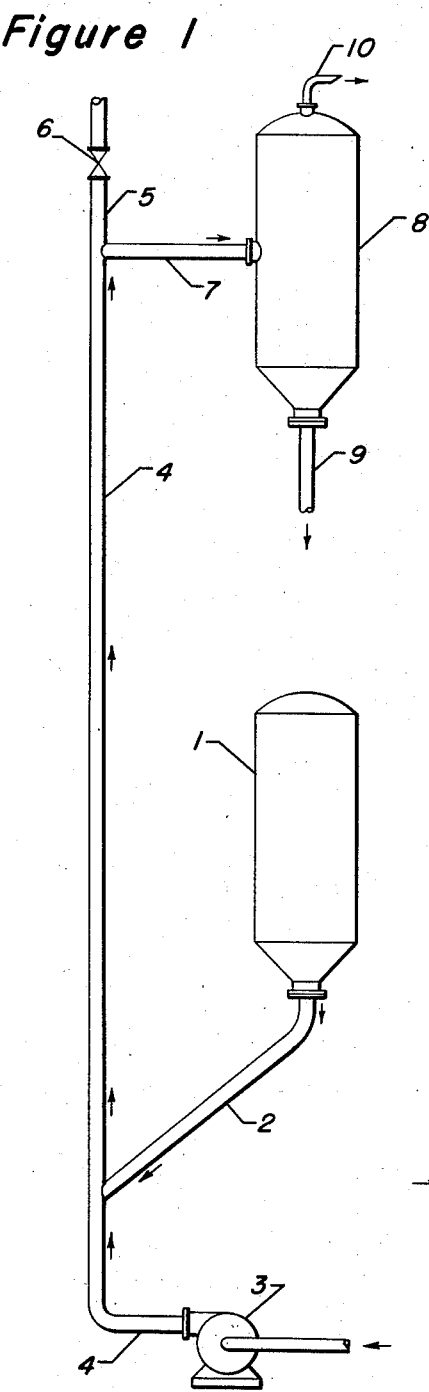

Oct. 20, 1959     J. W. McCAUSLAND     2,909,391
SOLIDS ELEVATOR
Filed April 21, 1958

INVENTOR:
John Woods McCausland
BY:
Chester J. Giuliani
Glen R. Grunewald,
ATTORNEYS

United States Patent Office 2,909,391
Patented Oct. 20, 1959

2,909,391

SOLIDS ELEVATOR

John Woods McCausland, Winnetka, Ill., assignor, by mesne assignments, to Universal Oil Products Company, Des Plaines, Ill., a corporation of Delaware Application April 21, 1958, Serial No. 729,812

3 Claims. (Cl. 302—17)

This invention relates to an apparatus for elevating solids and particularly to a gas-lift type of elevator for particle-form solids.

Continuous elevation of particle-form solids has long been an industrial problem. It has been solved in the past by many methods ranging from physically lifting solids by human or animal power to such industrial tools as bucket chains, moving belts or baskets or other mechanical means. More and more the gas-lift type of solids elevator has been used, first in processing gases with solid particles such as in the catalytic cracking process prevalent in the petroleum industry and later in other applications. In the catalytic cracking process it is desired to intimately contact a hydrocarbon vapor with a heterogeneous catalyst in the form of small distinct solid particles whereby the hydrocarbon vapor is converted to a more desirable substance through reactions promoted by contact with the catalyst. In this process, during the course of the reaction, the catalyst is deactivated and it must be passed to a separate zone for regeneration by combustion of the impurities deposited on it. After regeneration, the catalyst in hot, active form is returned to contact with the oil vapors in the reaction zone. Since two different reactions must be effected with the solid particles, it was found convenient to pass the particles from one zone to another by gravitation through a conduit and to return them to the initial contacting zone by blowing them there with the processing gas, whether that gas be the hydrocarbon to be processed or the regenerating air. Since both the reaction and regeneration processes are high temperature processes, the gas-lift method eliminated the extreme and severe mechanical problems associated with buckets or other mechanical conveyors in hot environments. In addition to being more satisfactory from the basis of mechanical ease, it was found that the gas-lift method of elevating particles had tremendously greater capacity than an equivalent sized mechanical lift. The method proved so successful that it presently is being widely adopted in industries where a vapor phase reactant is not employed but where an extraneous gas such as air is used merely for the purpose of elevating particles. This method is employed for conveying or elevating such particle-form materials as sand, flour, grain, etc.

The term "fluidized particles" embraces particles suspended in a gas whether as an expanded bed in a state of hindered settling or as a flowing suspension of solid particles entrained in a gas stream. In fluidizing particles or causing them to flow entrained in a gas stream, the particles entrained in the stream are given many characteristics of fluids. For example, fluidized particles or particles which are held in a state of hindered settling will flow as a fluid will, they will pass through valves, they will maintain a level in a vessel and even exert an equivalent to hydrostatic head. In some respects, however, the particles retain their solid characteristics, for example, they are not perfectly elastic and they will not flow through all types of valves. They will not successfully and for prolonged periods pass around abrupt corners such as elbows and T's used in standard pipefitting because the inelastic and abrasive qualities of the particles soon cause severe erosion at any point where they change their direction.

Fluidized particles have long and successfully been passed through gradually curved conduits called risers wherein abrupt corners are avoided. Although the curved riser conduits partly solve the problem of erosion at sharp corners, they introduce new problems such as the expense and difficulty of fabricating a large diameter conduit perhaps 60 feet long in the shape of a long, gradual, irregular curve. In addition to the difficulty and expense of fabrication, the gradual curves create a centrifugal-separator type of action so that the particles pass up the outside of the curve while the less dense gas passes up the inside of the curve. This separation causes the particles to be in continuous contact with the outside portion of the conduit. Therefore, even gradually curved risers experience severe erosion although to a lesser degree than those with abrupt corners. Furthermore, it requires more gas to effect fluidization than would be required in a straight conduit since half of the conduit is empty and the other half contains a disproportionately heavy particle loading. These problems currently exist and are considered a severe limitation on the use of gas-lifts. They have been solved partially by the use of straight internal risers in vessels, however, internal risers present difficulties in being inaccessible for flow rate control purposes and they require vertical alignment of the source of particles and their destination.

It is an object of this invention to provide a novel gas-lift type of particle elevator which eliminates the above-described difficulties and provides a particle elevating apparatus with straight conduits and square corners which reduces conduit erosion almost to the point of completely eliminating it.

In one embodiment, this invention relates to an apparatus for elevating particle-formed solids comprising in combination upper and lower particle holding chambers, a vertical conduit extending from below said lower chamber to at least the level of an intermediate point in said upper chamber, a horizontal conduit connecting said vertical conduit to said upper chamber, a sealed extension of said vertical conduit extending above said horizontal conduit and means for introducing particles from said lower chamber and carrying-gas into said vertical conduit.

Briefly, this invention provides a particle elevator for elevating particles from a source container to a destination container through a vertical pipe and a horizontal pipe that are connected by a square corner. The invention resides in the discovery that a square corner may be employed in a particle elevator provided the corner has a vertical extension above it which is sealed high enough above the intersection of the vertical and horizontal conduits to create a floating dynamic plug of particles. As will be hereinafter described, with slight modification the same technique can be employed to change the direction of a flowing particle stream from horizontal to vertical around a square corner without plugging or erosion.

Observations have shown that when this technique is employed, that is, the technique of passing particles around a square corner which includes a sealed extension of the conduit, a dense fluidized bed of particles floats in the area of the square corner. These particles are a dynamic plug; that is, although a dense plug of particles exists, the identity of the particles in the plug continuously changes and the particles are continuously changing their position with respect to each other and with respect to the conduit. The particles that are passing through the conduit and around the corner collide with the plug which has no fixed surface and rebound through the horizontal conduit. Any erosion which occurs is erosion of particles and is spread out over the entire quantity of particles whereas the erosion in ordinary elevating equipment is concentrated at a small area of the equipment, for example, the point where a particle-loaded gas stream changes direction. Experiments with this invention have shown that riser erosion is virtually non-existent during prolonged runs even using such abrasive material as sand for the particles being elevated.

It has been found that the extension of the vertical conduit should be about 1½ diameters, or in the range of from about 1 diameter to about 3 diameters of the riser in length in order to maintain an empty gas pocket behind the floating dynamic plug that is formed. Since the position of the plug is self-adjusting and varies up or down depending upon the velocity of the gas and the particle loading of the stream, the distance that the extension need extend beyond the bend will vary for the conditions in the process. The sealed extension may be sealed with a valve, for example, a gate valve so that in periods when the equipment is not used, access will be available to the inside of the riser for cleaning, inspection, etc., however, a solid plug or blank flange or the equivalent thereof is preferred.

As heretofore stated, when employing this invention to change the direction of flow from horizontal to vertical, a slight modification of equipment may be required. If the horizontal pipe extends beyond the position where the vertical pipe intersects it, the equipment may be successfully employed since the horizontal extension will fill with particles and the particles flowing in the horizontal pipe will collide with and rebound from particles rather than equipment in turning the corner. It is preferred, however, when changing the direction of a particle-loaded gas stream from horizontal to vertical, to bleed gas into the extension at a sufficient rate to prevent particles from packing in the extension. Employing this gas bleed in conjunction with the extension creates a floating dynamic plug in a bend from horizontal to vertical that is very similar to the floating dynamic plug heretofore described in relation with a bend from vertical to horizontal.

Since this invention is intended to broadly relate to elevation of particles, the terms used herein in describing various elements of the apparatus are intended in their broadest sense. Chambers, therefore, may be reactors, hoppers, bins, conduits or discharge points for trucks or railroad cars, etc. The vertical conduit referred to is classically a riser and it is intended to mean conduits having vertical direction components even though they may have lateral direction components or even definite horizontal components. Risers are also intended as including two or three stage elevators wherein a vertical riser terminates in a horizontal line and discharges into a second vertical riser so that excessive pressure drop across a single conduit is not encountered. Similarly, horizontal conduits are intended to include any conduits of any description which have a horizontal component even though they may have vertical components; that is, slant upward or downward. The sealed extension consists of an extension of the conduit which may be of the same, of smaller or larger diameter and which may be capped, headed, valved or sealed in any other way and the term "sealed" is intended to include an extension that contains a gas bleed such as hereinbefore described. The means for introducing particles may include simply a conduit discharging from the lower particle-containing chamber or it may include a screw conveyor or any equivalent for moving particles from one position to another.

The gas employed in the riser is intended to include the so-called uncondensible gases as well as vapors or mixed phase streams which are at least partly vaporous. It is also intended to include in the term "gas" the frequently employed technique of introducing a liquid which vaporizes upon contact with the particles and the resultant vapor becomes the carrying gas.

The accompanying drawings are presented to more clearly represent the apparatus of the present invention. Figure 1 is a schematic elevation view of one embodiment of the apparatus of this invention, Figure 2 illustrates the construction of the right angle bend when used for changing the direction of a stream from vertical to horizontal and Figure 3 illustrates an embodiment of a right angle bend employed to change the direction of a stream from horizontal to vertical.

Referring to Figure 1, a lower particle containing vessel 1 discharges particles from the bottom thereof as a dense descending column via line 2 which discharges into line 4. The particle-entraining gas is pumped via pump 3 into line 4 and the intersecting gas and particle streams pass as a suspension up conduit 4. Conduit 4 is a straight vertical conduit and accordingly, the suspension passes up it as a homogeneous mixture of particles and gas, the particles being evenly distributed across the cross-section of the conduit and causing very slight erosion of its walls since there is little impact. At the top of conduit 4 an extension 5 which is sealed by valve 6 exists. A horizontal conduit 7 connects riser 4 with an intermediate portion of upper particle-containing chamber 8. A floating dynamic plug of particles exists at or slightly above the intersection of conduits 4 and 7 and extends slightly into extension 5, however, a gas pocket exists between the floating dynamic plug and valve 6 so that there is no erosion of the seal. The particles passing into vessel 8 separate from the entraining gas stream either by settling from the decelerated gas stream or by any suitable particle separator and the separated, elevated particles may be discharged through conduit 9 as a dense bed while the carrying gas is discharged through line 10 to the atmosphere, to further processing or to be returned to pump 3.

Figure 2:
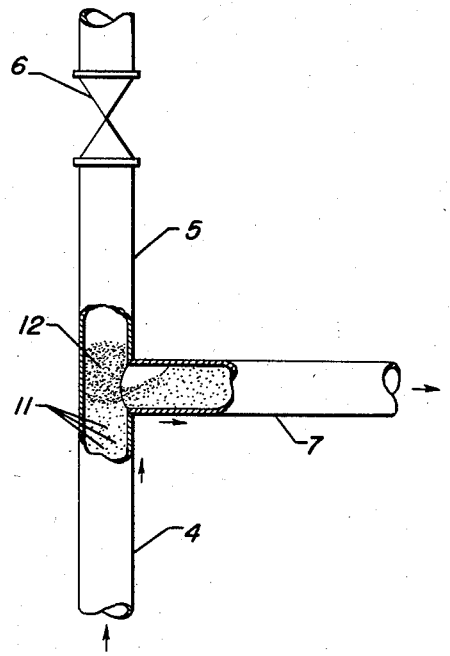

Figure 2 illustrates an enlargement of the intersection of conduits 4 and 7 and the extension 5. The cut-away portion illustrates a representative view of the floating dynamic plug and the suspension of particles in carrying gas. An evenly distributed suspension of particles 11 in a carrying gas pass upwardly through conduit 4 and, due to their inertia, tend to continue upwardly into extension 5, however, seal 6 in extension 5 prevents flow of gas through the extension so that a dense fluidized bed of particles 12 is maintained in the opening to extension 5. This dense fluidized bed, which is of small dimension, is the floating dynamic plug heretofore referred to. It may be seen that particles passing upwardly through conduit 4 will strike particles which are a portion of the floating dynamic plug 12 and will rebound from the plug through horizontal conduit 7. The entraining gas stream will pass around the corner as any fluid. The particles are thus deflected so that they pass from a straight line vertical path to a straight line horizontal path without impact against a metal wall, therefore conserving the metal which would, if subjected to continuous impact by particles, erode in a very brief period of time.

Figure 3:
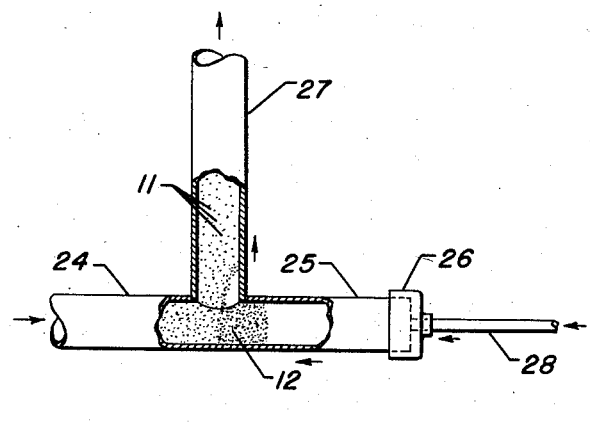

Figure 3 illustrates an enlarged view of a square corner suitable for use in this invention for changing the direction of a particle-loaded gas stream from horizontal to vertical. Line 24 carries the suspension in a horizontal direction and line 27 carries the suspension in a vertical direction. Extension 25 is maintained empty of particles by virtue of a bleed 28 which permits gas to pass in through seal 26, illustrated in this embodiment as a cap. The particles in straight line flow attempting to enter extension 25 are blown back towards conduit 24 by the gas bleed and as a result of these conflicting forces, the particles form a floating dynamic plug 12 from which particles 11 may rebound and pass upwardly through line 27 without impact against a metal surface.

From the foregoing, it may be seen that the combination of a riser and a sealed extension with lower and upper particle-containing zones provides a means by which particles may be elevated by the convenient and efficient gas-lift method without expensive and inefficient gradually curved conduits, employing ordinary pipefitting and eliminating the problem of conduit erosion in the transfer of solid materials.

I claim as my invention:

1. An apparatus for elevating particle-form solids comprising in combination upper and lower particle-holding chambers, a vertical conduit extending from below said lower chamber to an elevation at least as high as an intermediate point in the height of said upper chamber, a horizontal conduit connecting directly between said vertical conduit and said upper chamber, an extension of said vertical conduit extending above said horizontal conduit, means for introducing particles from said lower chamber and gas into said vertical conduit, and a seal in said extension a sufficient distance above the intersection of said vertical and horizontal conduits to form a floating dynamic plug of particles in the lower end of the extension and a gas pocket above the plug.

2. The apparatus of claim 1 further characterized in that the distance between said intersection and seal is at least 1½ diameters of said vertical conduit.

3. The apparatus of claim 1 further characterized in that the distance between said intersection and seal is from about 1 to about 3 diameters of said vertical conduit.

References Cited in the file of this patent

UNITED STATES PATENTS

| | | |
|---|---|---|
| 2,770,584 | Ray | Nov. 13, 1956 |
| 2,796,947 | Berg | June 25, 1957 |

FOREIGN PATENTS

| | | |
|---|---|---|
| 278,858 | Germany | Oct. 6, 1914 |